United States Patent
Williams

[15] 3,635,408
[45] Jan. 18, 1972

[54] TREATMENT OF CARBON LINING FROM REDUCTION CELLS

[72] Inventor: Merlyn Morris Williams, Montreal, Quebec, Canada

[73] Assignee: Alcan Research and Development Limited, Montreal, Quebec, Canada

[22] Filed: Aug. 25, 1970

[21] Appl. No.: 66,854

[52] U.S. Cl. ................................. 241/1, 23/209.9, 204/294
[51] Int. Cl. ............................................................ B02c 19/00
[58] Field of Search ....................... 241/1; 23/209.9; 204/294

[56] References Cited

UNITED STATES PATENTS

| | | | |
|---|---|---|---|
| 167,986 | 9/1875 | Burgess | 241/1 X |
| 1,734,992 | 11/1929 | Barrows | 241/1 |
| 2,732,283 | 1/1956 | Clukey | 23/88 |
| 3,506,745 | 4/1970 | Juel | 23/209.9 X |

*Primary Examiner*—Granville Y. Custer, Jr.
*Attorney*—Robert S. Dunham, P. E. Henninger, Lester W. Clark, Gerald W. Griffin, Thomas F. Moran, R. Bradlee Boal, Christopher C. Dunham, Robert Scobey and Henry T. Burke

[57] ABSTRACT

Carbon lining removed after long, chemical-accumulating use in an aluminum reduction cell is crushed and treated with dry steam at a temperature insufficient to destroy the carbon, so that unwanted carbides and nitrides are eliminated and the lining material is conditioned for recovery of useful values, advantageously by classification thereafter into a coarse fraction providing carbon in reusable form and a fine fraction in which chemical material is reclaimed, such as alumina and fluorides suitable for use in the fused bath of a reduction cell.

18 Claims, No Drawings

TREATMENT OF CARBON LINING FROM REDUCTION CELLS

BACKGROUND OF THE INVENTION

This invention relates to the treatment of carbon lining that has been used in aluminum reduction cells, e.g., of the type wherein aluminum metal is produced from alumina by electrolysis of a fused bath containing alumina and cryolite. In a more specific sense the invention is related to such treatment of the spent carbonaceous mass for the recovery of useful values, being advantageously both carbon and chemical material of the nature of fluorides and alumina.

In such cells, often called pots, the carbon lining or potlining comprises a carbon structure which constitutes the interior sidewalls and bottom of the cell and is disposed as a very thick lining in a steel shell. This carbon lining functions as the cathode of the pot, usually by virtue of electrical connection to a multiplicity of steel cathode bars or the like embedded in the bottom portion, and as a result of current passed from a carbon anode or anodes that extend downwardly into the bath, molten aluminum collects over the bottom and is withdrawn from time to time. The carbon lining can be constituted of preformed carbon blocks, called prebake block, joined together with a carbon mix (being particulate carbon with a suitable binder, as known) or it can be made entirely of carbon mix suitably pressed into place, e.g., to form a completely monolithic structure, or it can be composed of various combinations of prebake blocks and monolithic carbon mass, for instance at different regions or layers. Conventionally the lining receives suitable heat treatment so that the carbon mix is baked in place and all the carbon becomes baked to a hard mass, before the cell is put in use.

During continuous operation of the reduction cell, the carbon lining is continually and progressively affected by the molten electrolyte and accompanying high temperature of the process, to the extent that the carbon lining absorbs a considerable quantity of material from the bath. Deterioration is an unavoidable consequence of the growth and disruption of the carbon structure, and final failure or near failure of the pot eventually occurs, being evidenced by such conditions as leakage of metal or molten bath, substantial distortion of the cathode structure, or iron pickup in the product metal. In particular, the carbon lining is penetrated by various materials and to varying degrees according to the age of the pot, the location of a given lining area in the sides or bottom and the specifically selected procedure and temperature of operation, as well as other factors.

The materials thus penetrating the lining may include molten metal, but chiefly comprise values (in combined form) of sodium and aluminum, usually including cryolite or other fluorides. The aluminum, except for its fluoride, carbide and nitride forms, is in considerable part present as aluminum oxide (alumina) and in some part as metal. Thus the bath ingredients, which are mainly cryolite (sodium aluminum fluoride) and alumina, with minor quantities of other salts such as fluorides of sodium and calcium as may be desired for special purposes, tend to be absorbed in their original or other combined states. It is particularly to be noted that carbides and nitrides, notably of aluminum, are also formed during the aluminum reduction process, being so formed or deposited in the carbon lining. As is well known, a given pot will operate continuously for a rather long time, usually upwards of a year and often much longer, but eventually must be shut down, and have its carbon lining completely replaced.

Various procedures have been employed or proposed for recovering valuable material from failed potlining, i.e., the used lining of failed pots, chiefly to obtain fluoride and alumina values that can be reused in the reduction cells. Many of these procedures have been wet processes, in which the broken-up lining is treated by soaking, washing, cooking or like operations with appropriate aqueous solutions or liquors, for ultimate recovery of desired compounds in assertedly useful form. In many instances, the carbon residue is discarded, or the process may at some stage include a heating or roasting operation which serves to effectuate oxidation and thus disposal of the carbon.

It has also been proposed to grind the lining material to a fine size and then separate a carbon fraction from a fraction of chemical values by flotation, as in a standard flotation machine with appropriate reagents. Such operation appears relatively costly, as to equipment and materials. Moreover, in these and other procedures mentioned above, everything, including particularly the carbon is obtained in wet condition so that at least a further drying stage is required.

It is also known that used carbon lining, which may have a content of 20–50 percent of electrolyte chemicals as noted above (all percentages here and elsewhere being given by weight), will partly disintegrate over a long time of exposure to atmospheric air, producing a mass of fine gray powder and carbon lumps. In water, similar changes occur more rapidly, but the materials are then wet and subsequent handling is inconvenient. This disintegration is believed to be due, in considerable part, to chemical reactions between water or humid air and some of the chemicals present in the carbon, such as aluminum carbide and nitride, and aluminum oxide. These reactions are principally represented by the following equations or types of equations:

$$Al_4C + 12H_2O = 3CH_4 + 4Al(OH)_3 \qquad (1)$$
$$Al_2N_2 + 3H_2O = 2NH_3 + 2Al(OH)_3 \qquad (2)$$
$$Al_2O_3 + 3H_2O = 2Al(OH)_3 \qquad (3)$$

Another process heretofore proposed for treating potlining has involved roasting the crushed lining, as in a multistage apparatus, with direct flame-firing that includes a supply of water or water vapor along with the fuel. In such operation, the carbon is essentially completely destroyed, while the presence of water vapor converts the carbide and nitride values to hydrocarbon (methane) and ammonia. The result is a solid product of chemical compounds such as fluorides and alumina, with the carbon substantially all eliminated, at the prescribed high temperatures of the order of 1,150° F., by reaction, either of combustion or of combination with water. Hence the described roasting process affords no way of preserving carbon values, despite the fact that they are potentially useful.

As will be understood, carbon for potlining, whether consisting of metallurgical coke or carbon obtained by calcination of anthracite coal or by some other process, must be of relatively good quality, especially with respect to unwanted substances found in a number of grades of coal or carbonaceous materials; in consequence, carbon suitable for lining reduction cells is by no means inexpensive, and can be well worth reclaiming.

SUMMARY OF THE INVENTION

For the treatment of used carbon lining, from aluminum reduction cells, and particularly for the recovery of useful carbon as well as bath chemicals, the invention comprises a novel and relatively simple but effective treatment, comprising breaking up the lining, e.g., crushing to a moderately small size, and then subjecting the crushed material or fragments to a suitably controlled steam hydration for an appropriate time in a confined region, such operation being then followed by a classifying step, e.g., by screening, which allows recovery of a fine fraction of solids that contain useful chemical material, and a coarser fraction of solids that comprise carbon, preferably of such nature and composition as to be suitable for reuse. The operation is reliable and easily controlled, and not only affords removal, in effect, of carbides and nitrides, but directly yields both carbon and bath chemicals in an immediately dry, solid form, requiring no special processing before utilization respectively by incorporation in new carbon lining and by addition to molten electrolyte or to electrolyte compositions, for reduction cells.

In a specific, presently preferred mode of operation, the process comprises exposing the crushed carbon lining material in a suitable pressure hydrator, i.e., a closed vessel having means to support the carbon in accessible position, whereupon live steam, e.g., saturated or other dry steam, is supplied at an appropriate superatmospheric pressure, for example 15 p.s.i. (gauge) or higher. After continued exposure of the carbon material to the steam under pressure for an appropriate length of time, such as several hours or more, the treatment is concluded. A particular feature is that the nitride and carbide content is eliminated by reaction with the water that constitutes the steam, to yield gaseous products, e.g., ammonia and methane, in accordance with equations (1) and (2) above. Hence, the conclusion of reaction may usually be determined by disappearance of these compounds in the exhaust from the vessel.

The resulting solid product in the hydrator is essentially dry and has undergone some, indeed usually considerable, disintegration of its particles or pieces as an effect of the chemical decompositions or other reaction indicated above, these being one or more, ordinarily all, of the reactions (1), (2) and (3). In general, the product is found to be capable of size classification, as by screening or other suitable mode, whereby a fine fraction, such as minus one-sixteenth inch, may be separated. These finiest particles are found to contain (usually with some carbon) useful quantities of chemical substances of the sort originally contained in the used carbon lining (except for carbide and nitride, now in effect eliminated to the extent that such were present), e.g., material of the class of fluoride, oxide any hydroxide of aluminum, sodium and calcium. The coarser fraction of the hydrator product contains carbon; it may also contain some quantities of fluorides and other chemicals of the last-mentioned class, e.g., up to 20 percent and 30 percent respectively, but it is nevertheless usable, in most cases, for incorporation in lining materials or mixtures for new pots.

The finer fraction, as above, is chemically appropriate for reduction cell electrolytes, especially by reason of its content of fluoride and also oxide or hydroxide of aluminum, i.e., alumina or alumina hydrates. It usually contains some carbon depending on the type or age of the potlining that was treated (e.g., decreasing in amount with greater lining age), but the carbon content of this product fraction is significantly less and the chemical content significantly greater then in the untreated lining, and further processing (as by roasting) to remove carbon, if necessary, is greatly facilitated. Either after such further treatment, or directly in a number of cases which are preferably situations where the carbon content does not substantially exceed about 20 percent, this dry chemical product can be used in pot baths, i.e., for there augmenting the same chemical values which it contains and which can be specifically identified in it, if desired, by simple analysis.

It will be seen that the process is effective and relatively fast, while yielding products that are entirely dry and essentially only need to be separated by size classification. The carbon is fully stabilized by removing carbides and nitrides and to a considerable extent is recovered as carbon useful for new lining work. The chemicals are likewise in a form suitable for easier handling and further processing, indeed in a form ready for direct addition to a pot, especially in that the nitride and carbide contents, which are considered harmful in pot operation, have been removed.

DETAILED DESCRIPTION OF THE INVENTION

In detail, the present process may be particularly described in connection with examples of its practice, e.g., as successfully tested in pilot operations.

Upon failure of a reduction cell and after removal of the chief body of cryolite-alumina electrolyte and residual aluminum metal, the used carbon lining is broken out of the steel shell and may then be subjected to a crushing operation, reducing it to a particle size, for instance, of less than three-fourths of an inch, as to yield a product mainly comprising particles down to one-eighth of an inch. While the crushed material may, if desired, be graded, for example to remove the minus 1/16 inch particles, or preferably to remove an even finer fraction, i.e., minus 48 mesh (0.0116 inch Tyler screen), effective results have been obtained by using the ungraded product of an ordinary crushing operation. Likewise while the suggested maximum of 3/4 inch diameter particles has been found useful, it is conceived that other ranges can be employed, e.g., even including pieces as large as 4 inches, or sometimes still larger fragments, although longer hydration times may then be required, as can be readily determined by test.

The form of the pressure apparatus employed for the hydration stage does not seem to be critical in any general sense, the chief requirement being for a suitably confined vessel, adapted to hold the crushed lining material in appropriate exposure to the supplied steam under pressure. In one set of tests, the hydrator consisted of a cylindrical vessel 3 feet in diameter and 7½ feet high, having a removable steel rack which was seated in the vessel and which was designed to support a multiplicity of vertically spaced trays, e.g., 13 such trays, each holding up to 100 pounds of crushed carbon, spread out in the tray. The vessel had a safety valve, pressure gauge and thermometer of conventional forms and included a bleeding valve with an exhaust hose or pipe, e.g., to avoid accumulation of combustible gases and also to permit inspection or test of the departing steam or gas as for indication of the extent of the hydration reactions.

With the hydrator suitably loaded, live steam from an appropriate source is introduced at a suitable pressure, which in general is in the range from 15 to 40 p.s.i. (gauge), whereupon it is found that under the described circumstances and with the crushed lining in the particle size range below about three-fourths inch, effectively complete reaction is achieved in about 4 to 10 hours. Ammonia and hydrocarbons are evolved, respectively from nitrides and carbides, during the decomposition process. These will vary in amount, depending on the age of the lining and the place or places where particular quantities of lining were located in the reduction cell from which is was obtained. Although completion of reaction can be judged by other tests, or by experience in recurring types of cases, a suitable indication is usually afforded by the disappearance of the odor or odors of ammonia and some kinds of hydrocarbons from the exhaust gas, and indeed by the termination of gas evolution. It does not appear that within reasonable limits excess length of treatment time is significantly detrimental, but it is highly advantageous to achieve efficiency in time and in utilization of steam, by avoiding unduly prolonged treatment.

It is a special feature that the temperature can be and is ordinarily maintained below any level that would cause significant destruction of carbon, e.g., by direct oxidation of the nature of combustion, or more particularly, by reaction with water present as steam, e.g., in the so-called water-gas reaction. In general, the temperature should thus be kept below about 400° F. As will be understood, steam at 15–40 p.s.i. will usually have a temperature of the order of 250–350° F., or perhaps somewhat higher; in a broader sense, it is presently believed to be desirable that the steam pressure be in the range of 15 to 30 p.s.i. and the temperature in the range of 250° to 400° F.

It is of special advantage that the steam by dry, as distinguished from a mixture of steam and water droplets which would leave the treated lining fragments in an appreciably wet condition. Reference to dry steam is intended in a generic sense, i.e., as not excluding superheated steam or steam otherwise raised to a temperature above that corresponding to so-called dry saturated steam at the selected pressure. Preferably the steam is supplied live and under pressure, but in a broad sense the chief reason for super atmospheric pressure is to insure dryness.

The following are two representative examples of tests of the invention, in each instance employing a quantity of about 780 pounds of carbon lining material. In example 1, the material was relatively young prebake lining from a pot that had been in service 721 days. In example 2, the material was very old monolithic lining, having an age of 2,015 days, but nevertheless suitable for treatment; this material came from the side of a pot having prebake lining in other areas. In each instance the carbon lining material was crushed to a size of minus one-half inch, and was then subjected to steam treatment in a pressure hydrator as described above, using live steam at approximately 15 p.s.i. The hydration time was approximately 9 hours in each case, it being then observed that gas evolution had apparently ceased and there was no odor of ammonia or any hydrocarbon type in the steam bleeding from the vessel. The two lots of lining material, before the steam hydration, had the following compositional characteristics (by weight):

|  | Example 1 | Example 2 |
| --- | --- | --- |
| % Nitrides | 0.3 | 1 |
| % Carbides | 1.5 | 6 |
| % Other chemicals | 39 | 59 |
| % Carbon | 59 | 34 |

In each case, upon withdrawal from the vessel, the treated lining material was found to be considerably disintegrated, particularly in yielding a greater amount of fine particles, and it was then classified by screening into a fine fraction of minus one-sixteenth inch and the remaining coarser fraction.

The chemical content of the fine fraction in each instance included useful quantities of fluorides and alumina or alumina hydrate, analyses being as follows (balance essentially O and H, in oxide and hydroxide):

|  | Example 1 | Example 2 |
| --- | --- | --- |
| % Elemental Carbon | 43.1 | 18.3 |
| % Al | 9.8 | 16.9 |
| % Na | 12.9 | 15.4 |
| % Ca | 1.4 | 4.4 |
| % F | 13.7 | 18.3 |

It was found that the material of these minus one-sixteenth inch fractions of the examples could be fed to a reduction pot (advantageously after burning out the carbon in the example 1 fraction), in useful, small quantities, for introducing chemical values of the stated character, as for example in replenishment of such values of the fused bath.

The coarser fraction, i.e., plus one-sixteenth inch, of example 1, was found to contain approximately 53 percent carbon, the balance being essentially fluorides, alumina and alumina hydrate. This coarser, carbon-containing fraction was appropriate for use as fresh carbon, in making new potlining, for example, either in admixture with new, electrically calcined anthracite, or even entirely by itself. In such utilization of the recovered carbon from this and other practice of the process, the coarse fraction can be further ground as necessary, to particle size (e.g., at least 25 percent finer than 20 mesh) desired for making a lining mix with the usual binder. Suitable comminution, for example, is such as to provide screen analyses of the order given in the tables set forth hereinbelow, it being understood that screen sizes herein are given by standard mesh designation of openings per linear inch. The coarse fraction from example 2 was relatively poor in carbon, and thus would have more potential utility for chemical values than for some very limited use in potlining mixtures.

It will now be seen that in general, the used, i.e., failed or spent carbon lining material, treated as fragments in the hydrator, consists essentially of (a) carbon; (b) unwanted material of the class consisting of aluminum carbide and nitride; and (c) chemical material of the class consisting of fluoride and oxide of aluminum, sodium and calcium, with some hydroxides if the removed lining has been exposed to hydration by the atmosphere for some time. Other chemical values may be present in minor amount, including aluminum metal, but substances from the above classes represent the principal materials of significance herein, one or more of which may be found in the failed lining. As will also be appreciated, the reactions to which aluminum carbide and nitride are subjected by the steam treatment, yield further quantities of aluminum hydroxide (alumina hydrate), or conceivably oxide, which thus in effect augment the defined class (c) of other chemical materials originally present in the lining.

The process has been found applicable to spent lining both of the monolithic type and prebake type, but is of special advantage for linings or parts of linings of prebake character, i.e., originally constituted of such blocks cemented together with carbon mix. Inasmuch as the prebake blocks are made originally with less binder than monolithic mix, they represent basically a higher quality of carbon, and since they are usually formed at a substantially higher temperature than is employed for baking monolithic mix in the pot shell, they are denser and less susceptible of chemical attack. In consequence, the reusable carbon product from the present steam treatment is on the average of a higher quality when the failed lining has consisted of prebake block. The process is, although useful, somewhat less satisfactory, from the standpoint of economics or the economic feasibility of performing it, with extremely old lining, i.e., as to pots which happen to have been able to continue in operation for very long times. Thus it is presently preferred that the procedure be used with carbon from monolithic linings that have not been in use for more than about 1,200 days, or with carbon from prebake linings that have not been in use for more than about 2,400 days, or more advantageously not more than about 1,800 days.

In general, the recovered carbon of the process contains much of the original carbon of the spent lining, and the treated and classified particles or pieces consist, on the average, of at least 40 percent carbon, usually amounts of at least 50 percent up to 90 percent. The remaining content of this coarser, i.e., carbon fraction, may consist of retained fluorides, up to 20 percent, and other chemicals (essentially oxides or hydroxides, mostly of aluminum) up to 30 percent, the total chemicals being in all cases the balance over the carbon content. The relative quantities of carbon and chemicals are found to depend on the age and nature of the lining being processed, the higher proportions of carbon being found in material from newer pots and/or prebake-lined pots.

While ordinarily the size classification following the steam treatment is achieved, e.g., by screening, without further comminution except as may occur in the breakup of small lumps during necessary handling, the possibility of some further crushing or grinding at that time (before screening to separate the fine chemical fraction) is not excluded, especially if the original crushing or fragmentation of the failed carbon lining has left pieces substantially larger than indicated above, as introduced into the hydrator. It is apparent that the duration of the steam treatment will usually be longer for larger fragments so that efficiency is ordinarily promoted by the preferred extent of precrushing.

The reclaimed carbon, preferably upon further grinding to suitable fineness, is usable in the same manner as new carbon for making mixes to be employed in constituting potlining, or portions thereof, or bodies to make up such lining. Specifically, the recovered carbon material has been demonstrated to be useful as a substitute for electrically calcined anthracite, kiln calcined anthracite and metallurgical coke, in varying proportions up to 100 percent, for mixes constituted in the usual way with a conventional binder (e.g., 16 percent of the mix) such as coal tar pitch or the like. Mixtures where the new carbon is 50 percent or more of the total of new and reclaimed carbon are eminently suitable, but mixes of 100 percent recovered material, especially when derived from prebake lining of no more than medium age, have been satisfactory. In general reclaimed carbon with relatively high content of noncarbonaceous material is better used with at least an equal amount of new carbon, but it will be understood that a significant content of fluorides and alumina is not disadvantageous, in that the finally baked and hardened lining body then already has some filling of such chemicals and withdraws correspondingly less of the latter from the molten electrolyte, in use.

As an illustration of the physical similarity of the recovered material, i.e., hydrated potlining carbon, to new electrically calcined anthracite, the following table sets forth particle size characteristics (percentages by weight) of samples of each, prepared in the same way to constitute aggregates for potlining mix:

TABLE 1

| Mesh | Electrically Calcined Anthracite | | Hydrated potlining Carbon | |
|---|---|---|---|---|
| | % Retained | Cumulative % | % Retained | Cumulative % |
| 20 | 14.9 | 14.9 | 19.6 | 19.6 |
| 48 | 46.7 | 61.6 | 40.8 | 60.4 |
| 100 | 23.5 | 85.1 | 14.5 | 74.9 |
| 200 | 9.6 | 94.7 | 11.5 | 86.4 |
| −200 | 5.3 | 100.0 | 13.6 | 100.0 |

Further examples of such aggregates, with the particle size analyses in greater detail, are as follows:

TABLE 2

| Mesh | Electrically Calcined Anthracite | | Hydrated potlining Carbon | |
|---|---|---|---|---|
| | % Retained | Cumulative % | % Retained | Cumulative % |
| +3 | 10.1 | 10.1 | 9.4 | 9.4 |
| 6 | 9.8 | 19.9 | 10.1 | 19.5 |
| 10 | 2.0 | 21.9 | 2.3 | 21.8 |
| 20 | 4.9 | 26.8 | 7.3 | 29.1 |
| 35 | 13.8 | 40.6 | 13.4 | 42.5 |
| 48 | 10.6 | 51.2 | 8.9 | 51.4 |
| 65 | 11.7 | 62.9 | 9.3 | 60.7 |
| 100 | 10.2 | 73.1 | 8.4 | 69.1 |
| 150 | 6.4 | 79.5 | 5.7 | 74.8 |
| 200 | 6.5 | 86.0 | 9.4 | 84.2 |
| −200 | 14.0 | 100.0 | 15.8 | 100.0 |

Aggregates of these kinds, made with the recovered carbon material, have been successfully tested by incorporation in various rodding, bedding, jointing and side lining mixes in pots, i.e., pots put into actual use, and no adverse effects have been noted in such tests after a significantly long time of continuous operation.

It is to be understood that the invention is not limited to the specific examples herein described but may be carried out in other ways without departure from its spirit.

I claim:

1. In a method of treating used, chemical-containing, carbon lining of an aluminum reduction cell, the step of treating fragments of said used lining in a confined region with dry steam at a temperature insufficient for substantial reaction of carbon in the region, for a sufficient time to exert disintegrating influence on said used lining and to convert same into form capable of treatment for classification by particle size to yield a fine fraction containing chemical material derived from the chemical content of the used lining and a coarser fraction of material which contains carbon.

2. A method as defined in claim 1, in which said steam treatment is effected at a temperature not higher than about 400° F. for at least several hours.

3. A method as defined in claim 2, in which said steam treatment is effected at a pressure of at least about 15 p.s.i. for at least about 4 hours.

4. A method as defined in clam 2 in which said used lining, as subjected to said steam treatment, has particle sizes not greater than about 4 inches, and said steam treatment is effected for a period of time in a range up to about 10 hours.

5. A method as defined in claim 4, in which said steam treatment is effected at a temperature in the range of 250° to 400° F.

6. A method as defined in claim 1, in which said used lining is lining predominantly constituted of prebake blocks.

7. A method as defined in claim 1, in which sad used lining which is treated contains material of the class consisting of carbide and nitride, and said treating step is effective for reaction of said steam with said last-mentoned material to release gaseous product of the class consisting of hydrocarbon and ammonia.

8. A method as defined in claim 7, in which said used lining which is treated contains aluminum oxide, and said treating step is effective for hydration of at least some of said aluminum oxide.

9. A method of treating used carbon lining of an aluminum reduction cell that has contained a molten bath, said used lining containing carbon, unwanted material of the class consisting of aluminum carbide and nitride, and chemical material of the class consisting of fluoride, oxide and hydroxide of aluminum, sodium and calcium, comprising crushing said used lining, treating the crushed lining in a confined region with dry steam for converting the unwanted material to gaseous product and to material which is of the class of aluminum oxide and hydroxide and which augments said chemical material in the crushed lining, while maintaining the crushed lining at a temperature insufficient for substantial reaction of carbon in the region and while withdrawing sad gaseous product from the region, to yield a substantially dry, particulate used lining product classifiable by particle size into a fine fraction, which contains chemical material of the aforesaid class, and a coarser fraction, which contains carbon in amount of at least about half its composition.

10. A method as defined in claim 9, in which said steam treatment is effected at superatmospheric pressure and a temperature not higher than about 400° F.

11. A method as defined in claim 10, in which said crushed lining has particle sizes less than about three-fourths inch and said steam treatment is effected for at least several hours.

12. A method as defined in claim 11, in which said steam treatment is effected at pressure of about 15 to 40 p.s.i. and for about 4 to 10 hours.

13. A method as defined in claim 10, in which said used lining which is treated contains at least about 50 percent carbon, and said steam treatment is effected for a sufficient time to yield said product classifiable into said fractions of which the fine fraction is suitable for employment as chemical addition in the molten bath of a reduction cell and the coarser fraction is suitable for incorporation in new carbon lining of a reduction cell.

14. A method as defined in claim 13, which includes the step of subjecting said product to classification by particle size to separate said fine and coarser fractions.

15. A method as defined in claim 14, in which said fine fraction consists of and is separated as material having particle size smaller than about one-sixteenth inch.

16. A method as defined in claim 9, in which said used lining which is treated contains at least about 50 percent carbon, and said steam treatment is effected at superatmospheric pressure for a sufficient time to yield said product classifiable into said fractions of which the coarser fraction is suitable for incorporation in new carbon lining of a reduction cell 17. In a method of treating used, chemical-containing, carbon lining of an aluminum reduction cell, the step of treating fragments of said used lining in a confined region with dry steam at a temperature insufficient for substantial reaction of carbon in the region, for sufficient time to exert disintegrating influence on said used lining and to convert same into form capable of treatment for classification by particle size to separate, from a coarser fraction, a fine, chemical-containing fraction having a substantially lower proportion of carbon and a substantially higher content of chemical material than said used carbon lining which was treated.

18. A method as defined in claim 17, in which said used lining which is treated contains material of the class consisting of carbide and nitride, and said treating step is effective for reaction of said steam with said last-mentioned material to release gaseous product of the class consisting of hydrocarbon and ammonia.

* * * * *

UNITED STATES PATENT OFFICE
CERTIFICATE OF CORRECTION

Patent No. 3,635,408　　　　　　　　　Dated January 18, 1972

Inventor(s) MERLYN MORRIS WILLIAMS

It is certified that error appears in the above-identified patent and that said Letters Patent are hereby corrected as shown below:

Col. 4, line 59, after "15 to", "30" should read --230--

Col. 8, line  6, for "sad" read --said--
　　　　line 28, for "sad" read --said--

Signed and sealed this 27th day of June 1972.

(SEAL)
Attest:

EDWARD M. FLETCHER, JR.　　　　　ROBERT GOTTSCHALK
Attesting Officer　　　　　　　　　Commissioner of Patents